(12) United States Patent
French et al.

(10) Patent No.: US 6,392,606 B1
(45) Date of Patent: May 21, 2002

(54) ANTENNA EXTENSION SYSTEM

(75) Inventors: Daniel W. French, Portsmouth, RI (US); Theodore C. Gagliardi, Somerset, MA (US); Steven L. Camara, Portsmouth; John J. Vaillancourt, Tiverton, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/740,758

(22) Filed: Dec. 14, 2000

(51) Int. Cl.[7] .............................. H01Q 1/04; H01Q 1/34
(52) U.S. Cl. .................. 343/709; 343/719; 343/883
(58) Field of Search ..................... 343/719, 709, 343/883; H01Q 1/04, 1/10, 1/34

(56) References Cited

U.S. PATENT DOCUMENTS 3,158,865 A * 11/1964 McCorkle ................... 343/709
4,053,896 A * 10/1977 Bitter et al. ................ 343/709

* cited by examiner

Primary Examiner—Michael C. Wimer
(74) Attorney, Agent, or Firm—Michael J. McGowan; James M. Kasischke; Prithvi C. Lall

(57) ABSTRACT

An antenna extension system for extending an antenna from an underwater vehicle. The system comprises a housing disposed wholly within the vehicle and a plurality of telescopically connected tiers extendible from a base tier disposed within the housing, an innermost of the tiers being adapted to support the antenna. A cable extends from a base portion of the housing and is fixed at a distal end to the antenna. A plurality of telescopically connected fairings are extendible from the housing and are disposed around the tiers and the cable. A cap is fixed to a distal end of a distalmost of the fairings for enclosing the antenna. Extension of the telescopically connected tiers from the base tier moves the antenna from wholly inside the housing to a position extending outwardly from the vehicle, and extends the cable and fairings with the tiers.

15 Claims, 4 Drawing Sheets

ANTENNA EXTENSION SYSTEM

STATEMENT OF GOVERNMENT INTEREST

The invention described herein may be manufactured and used by and for the Government of the United States of America for Governmental purposes without the payment of any royalties thereon or therefor.

BACKGROUND OF THE INVENTION (1) Field of the Invention

The invention relates to antenna assemblies and is directed more particularly to an extension system for moving a navigational antenna, or the like, from a compact state within the hull of an underwater vehicle to an extended state wherein the antenna extends outwardly beyond the hull of the vehicle.

(2) Description of the Prior Art

It is known to provide an unmanned underwater vehicle (UUV) for carrying out a mission without risk of loss of human life. It often is beneficial to launch a UUV from a submerged submarine, more particularly from one of the submarine's torpedo tubes, requiring that the UUV be of a round configuration widthwise and a compact size, not exceeding twenty-one inches in diameter. No radiant projections from the hull of the UUV can be accommodated.

While computerized guidance systems for such UUVs are utilized, given the shifting currents, tides, underwater streams, and the like, it is difficult for the computer to identify with pin-point accuracy the current position of the UUV and therefore difficult to initiate absolutely true course changes, and the like.

It is known that through an existing Global Positioning System (GPS), a vessel with a navigational antenna, referred to as a "GPS Antenna", can quickly ascertain its precise position, and that with such an input, a computerized guidance system can quickly compute and set in motion any required course change in order to reach a selected destination.

There is, then, a need for an antenna extension system which is capable of extending a compact antenna housed within a torpedo-size vessel, outwardly from the vessel to obtain a GPS fix, and return the antenna to its compact condition wholly within the UUV.

SUMMARY OF THE INVENTION

An object of the invention is to provide an antenna extension system operative to extend a GPS antenna, or other antenna, from a compact condition wholly inside a UUV, or other underwater vehicle, to a position extending therefrom, in order to obtain a GPS fix, and to return the antenna to its compact condition within the UUV.

With the above and other objects in view, as will hereinafter appear, a feature of the present invention is the provision of an antenna extension system for extending an antenna from an underwater vehicle. The system comprises a housing disposed wholly within the vehicle, a plurality of telescopically connected tiers extendible from a base tier disposed within the housing, an innermost of the tiers being adapted to support the antenna. A coaxial cable extends from a base portion of the housing and is fixed at a distal end to the antenna. A plurality of telescopically connected fairings are extendible from the housing and disposed around the tiers and the cable. A cap is fixed to a distal end of a distalmost of the fairings for enclosing the antenna. Extension of the telescopically connected tiers from the base tier moves the antenna from wholly inside the housing to a position extending outwardly from the vehicle, and extends the cable and fairings with the tiers.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein.

DESCRIPTION OF THE PREFERRED EMBODIMENT

Figure 1:
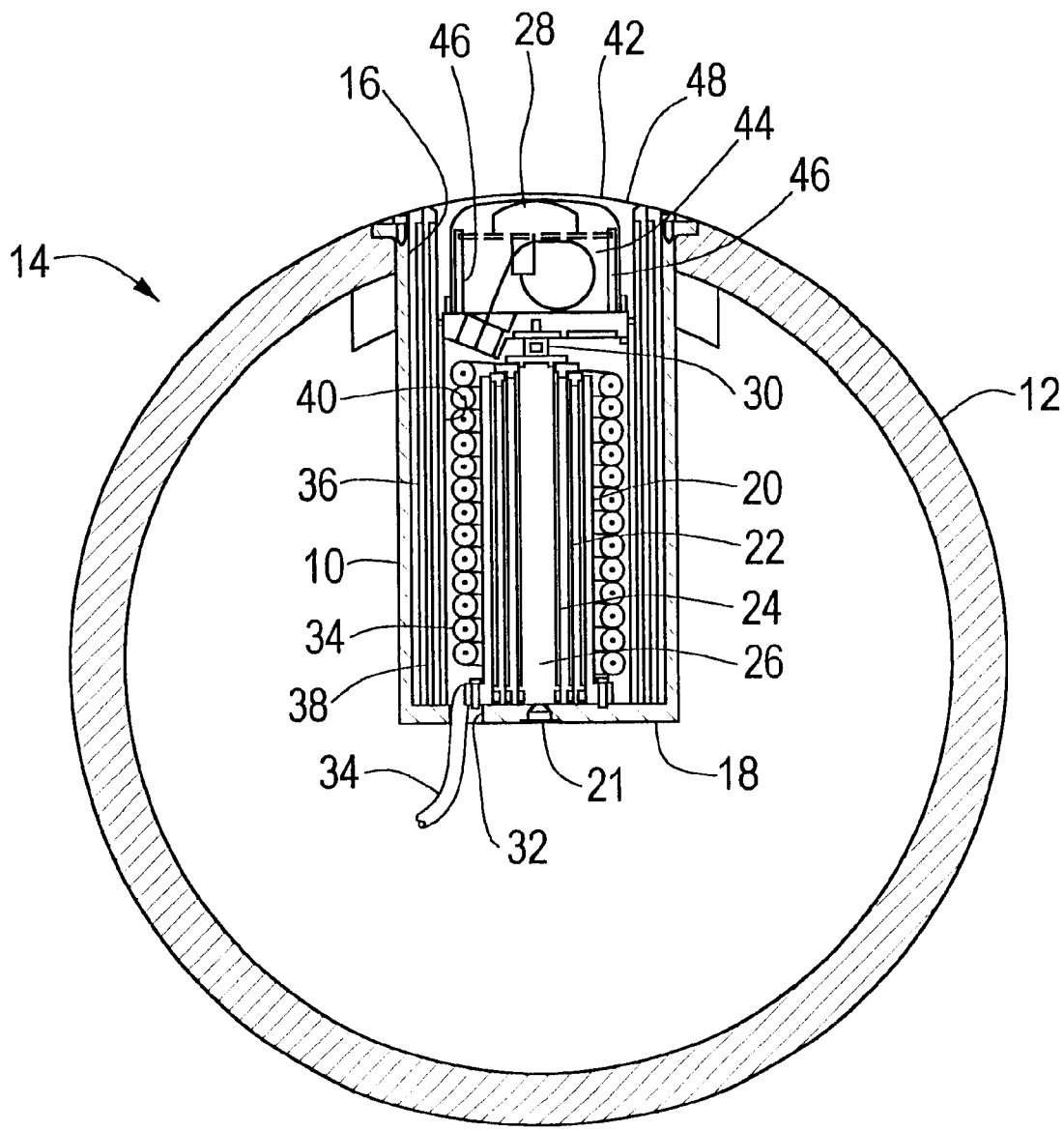
FIG. 1 is an athwartships sectional view of an unmanned underwater vehicle with an antenna and antenna extension system shown in a compact condition wholly within the vehicle.

Referring to FIG. 1, it will be seen that an antenna extension system illustrative of a preferred embodiment of the invention includes a cylindrically-shaped housing 10 disposed wholly within a hull 12 of an underwater vehicle 14. The housing 10 is open at its outboard end 16 and is therefore flooded with sea water in operation.

Fixed to an inboard end 18 of housing 10, concentrically within housing 10, is a round, tubular base tier 20. A fluid port 21 is disposed centrally of the housing inboard end and is in communication with the interior of base tier 20. A plurality of additional tiers 22, 24 (two shown in the drawings) are telescopically connected to base tier 20. Finally, an innermost tier 26 is telescopically connected to tier 24. Tiers 22 and 24 are of a round tubular structure, while tier 26 may comprise a round tubular member or solid rod. An antenna 28, such as a GPS antenna, is fixed to the distal end 30 of innermost tier 26.

Figure 3:
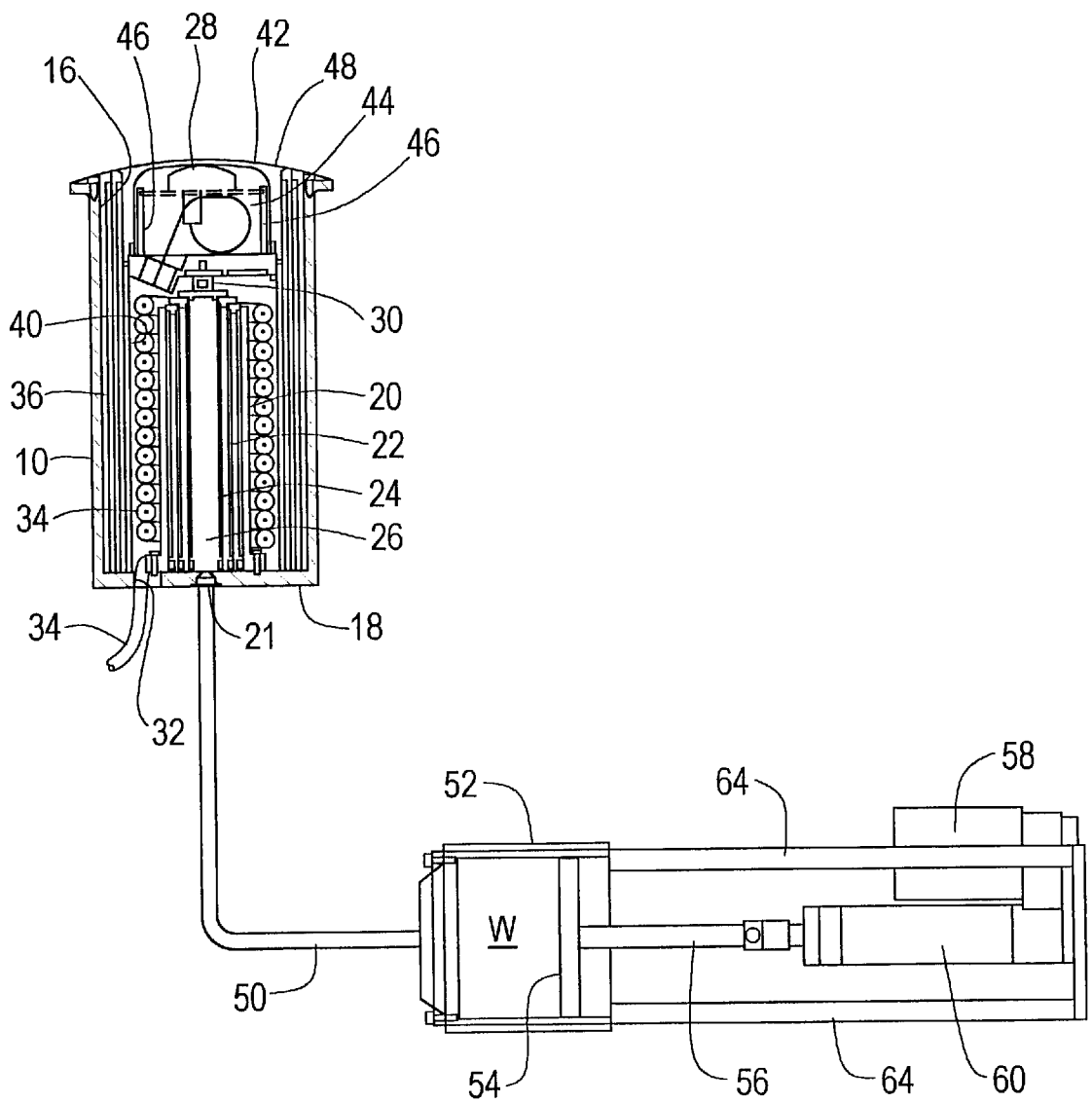
FIG. 3 is similar to FIG. 1, but shows diagrammatically the antenna extension system in its compact condition and in combination with an actuator.

The housing inboard end 18 is further provided with a coaxial cable penetration port 32 through which there extends a coaxial cable 34 (FIGS. 3 and 4) which winds around the tiers 20, 22, 24 and 26, and is connected to the antenna 28.

The extension system further includes a base fairing 36 disposed in the housing 10 and a plurality of extendible fairings 38, 40 telescopically connected to the base fairing 36. A cap 42 is fixed to the distal end of the distalmost fairing 40 and defines a dry space 44 in which is disposed the antenna 28 and, typically, strobe lights 46. The space between fairings 36, 38 and 40 and tiers 20, 22, 24 and 26 is flooded with seawater in operation. The outboard end surface 48 of the cap 42 is contoured to provide a continuation of the exterior configuration of the vehicle hull 12 (FIG. 1).

Figure 2:
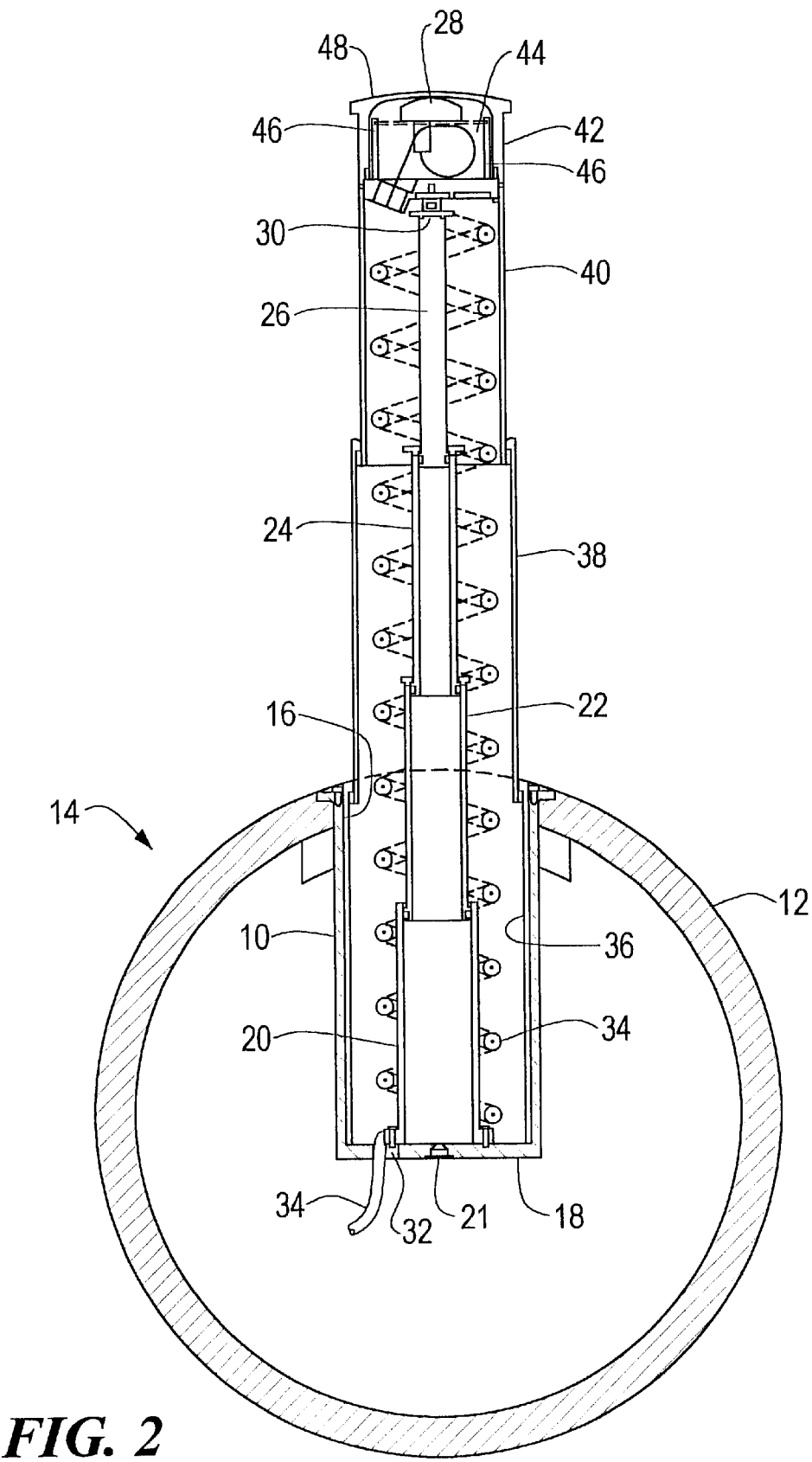
FIG. 2 is similar to FIG. 1, but shows the antenna extension system fully extended.
Figure 4:
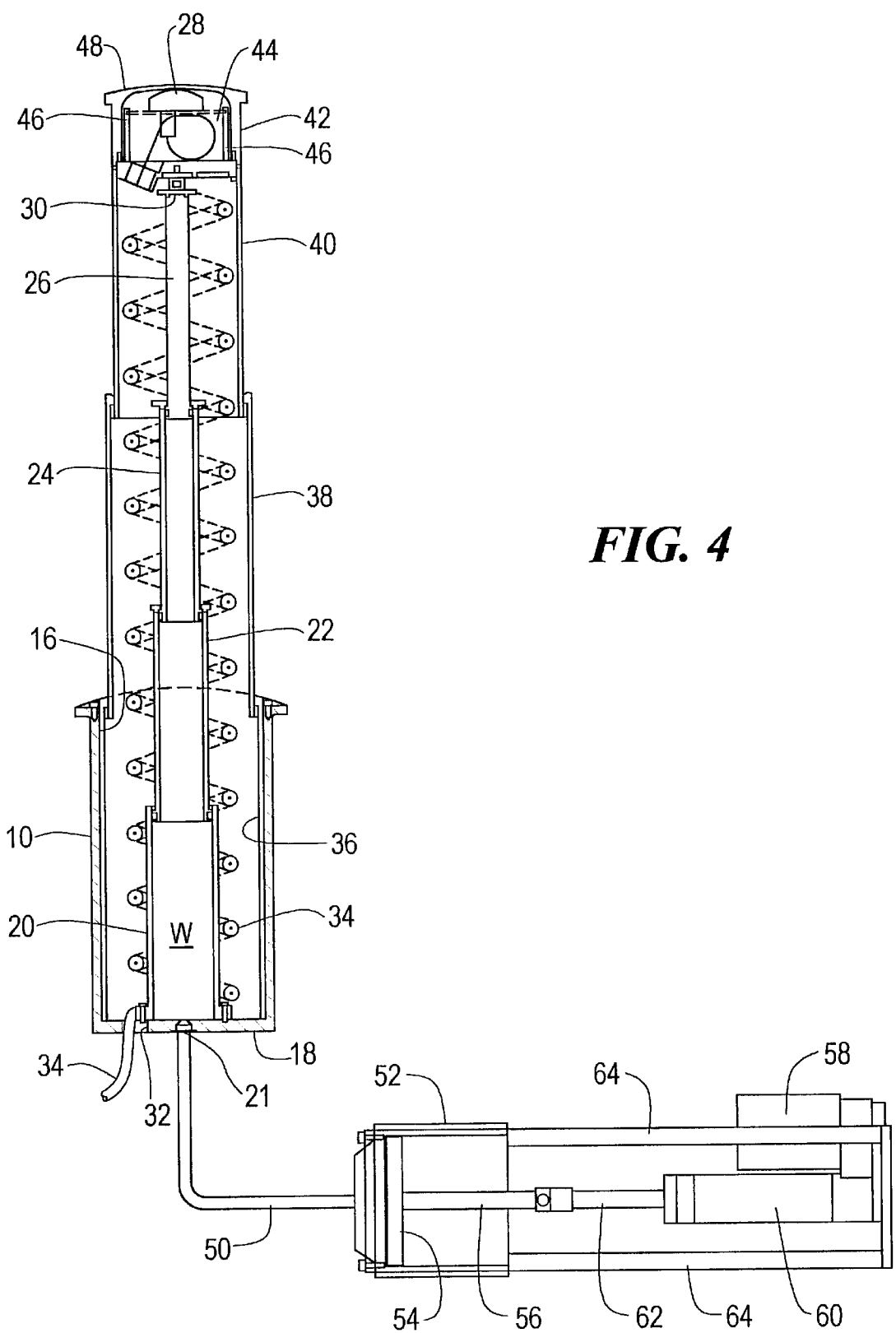
FIG. 4 is similar to FIG. 3, but shows diagrammatically the antenna extension system in its fully extended condition and in combination with the actuator.

Connected to the housing 10 so as to communicate with the interior of the tiers 20, 22 and 24 is a hydraulic feed line 50 (FIGS. 3 and 4) in communication with a cylinder 52 housing a piston 54 fixed, as by brackets 64, to a piston rod 56. An electric motor 58 is mounted near the cylinder 52 and is operable to drive an actuator 60, which is operable to drive the rod 56, fixed to an end of an actuator rod 62 (FIG. 4), and thereby the piston 54, axially. To the left of the piston 54, as viewed in FIG. 3, the cylinder contains a selected fluid, preferably a liquid, preferably water W. When the piston 54 is moved leftwardly, water is forced through feed line 50 into the tier 24 to urge the tier 26 upwardly, followed by the tiers 24 and 22, until all tiers are extended, as shown in FIGS. 2 and 4. When the piston 54 is moved rightwardly, as viewed in FIGS. 3 and 4, the water returns to the cylinder 52, and the tiers move from the position shown in FIGS. 2 and 4 to the positions shown in FIGS. 1 and 3.

In operation, the computerized guidance system (not shown) of the underwater vehicle 14 periodically effects movement of vehicle 14 to near or on the water surface. Upon attaining a position near or on the surface, the vehicle computer sends a signal to the motor 58 to cause motor 58 to move piston 54 leftwardly, as viewed in FIGS. 3 and 4, moving water W under pressure from the cylinder 52, through the feed line 50, and into the interior of the tiers 20, 22, 24 to extend the tiers telescopically. As the tiers 22, 24, 26 extend, so do the cable 34 and fairings 38, 40. The cable 34 places the GPS antenna 28 in communication with the vehicle computerized guidance system or other instrumentation. The fairings 36, 38, 40 serve as protectors for the tiers and the cable.

In practice, the system remains extended for about four seconds, during which time the vehicle guidance computer receives its position and computes a course change to correct any deviation from course to target. Thereafter, the guidance system computer reverses the motor 58 to retract the antenna, and effects submergence of the vehicle and continuation in the mission of the vehicle along the new course. When extended, the antenna system extends about 26.5 inches beyond the vehicle hull 12.

There is thus provided an antenna extension system which facilitates an underwater vehicle updating its navigational accuracy while continuing on its mission. The course correction procedure can be effected numerous times in a normal mission.

If desired, the onboard computer can be programmed to turn on the strobe lights 46 when the vehicle reaches the surface, to assist in location and retrieval of the vehicle after tests and/or practice missions, and the like.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. An antenna extension system for extending an antenna from an underwater vehicle, the system comprising:

a housing disposed wholly within the vehicle;

a plurality of telescopically connected tiers extendible from a base tier disposed within the housing, an innermost of said tiers being adapted to support the antenna;

a cable extending from a base portion of said housing and fixed at a distal end to the antenna;

a plurality of telescopically connected fairings extendible from the housing and disposed around said tiers and said cable;

a cap fixed to a distal end of a distalmost of said fairings for enclosing the antenna; and wherein extension of said telescopically connected tiers from said base tier moves the antenna from wholly inside said housing to a position extending outwardly from the vehicle, and extends said cable and fairings with said tiers.

2. The antenna extension system in accordance with claim 1 wherein said housing is an open ended cylindrically-shaped housing.

3. The antenna extension system in accordance with claim 2 wherein said base tier is a round tubular tier fixed concentrically within said housing.

4. The antenna extension system in accordance with claim 3 wherein said innermost of said tiers comprises a selected one of a tubular member and a solid rod.

5. The antenna extension system in accordance with claim 4 wherein tiers between said base tier and said innermost tier are round tubular tiers.

6. The antenna extension system in accordance with claim 1 wherein said cable winds around said tiers and is disposed between said tiers and said fairings.

7. The antenna extension system in accordance with claim 6 wherein said housing has a penetration port therein and said cable extends through said penetration port for connection to onboard instrumentation.

8. The antenna extension system in accordance with claim 3 wherein said housing is provided with a fluid port extending through a wall of said housing and in communication with the interior of said base tier.

9. The antenna extension system in accordance with claim 8 and further comprising a fluid feed line connected to said housing and in communication with said fluid port.

10. The antenna extension system in accordance with claim 9 and further comprising a piston and cylinder assembly, said cylinder being in communication with said feed line.

11. The antenna extension system in accordance with claim 10 and further comprising an actuator adapted to drive said piston in said cylinder to force fluid in said cylinder through said feed line and into said base tier to cause said system to extend.

12. The antenna extension system in accordance with claim 11 wherein said actuator is adapted to draw said piston in said cylinder to draw fluid in said tiers through said feed line into said cylinder to cause said system to retract.

13. The antenna extension system in accordance with claim 12 further comprising fluid within said cylinder, said feed line and said base tier.

14. The antenna extension system in accordance with claim 13 wherein said fluid is a liquid.

15. The antenna extension system in accordance with claim 14 wherein said liquid is water.

* * * * *